(12) United States Patent
Higashi et al.

(10) Patent No.: US 11,969,793 B2
(45) Date of Patent: Apr. 30, 2024

(54) ADDITIVE MANUFACTURING DEVICE

(71) Applicant: Mitsubishi Power, Ltd., Kanagawa (JP)

(72) Inventors: Kei Higashi, Tokyo (JP); Kazuhiro Yoshida, Tokyo (JP); Chikara Kurimura, Tokyo (JP); Takanao Komaki, Yokohama (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 730 days.

(21) Appl. No.: 17/256,430

(22) PCT Filed: Jul. 18, 2019

(86) PCT No.: PCT/JP2019/028205
§ 371 (c)(1),
(2) Date: Dec. 28, 2020

(87) PCT Pub. No.: WO2020/022172
PCT Pub. Date: Jan. 30, 2020

(65) Prior Publication Data
US 2021/0268588 A1 Sep. 2, 2021

(30) Foreign Application Priority Data
Jul. 23, 2018 (JP) .................. 2018-137916

(51) Int. Cl.
*B22F 12/70* (2021.01)
*B22F 12/41* (2021.01)
(Continued)

(52) U.S. Cl.
CPC .............. *B22F 12/70* (2021.01); *B22F 12/41* (2021.01); *B33Y 30/00* (2014.12); *B33Y 40/00* (2014.12)

(58) Field of Classification Search
CPC ........... B22F 12/70; B22F 12/41; B33Y 30/00
(Continued)

(56) References Cited

U.S. PATENT DOCUMENTS 6,583,379 B1 6/2003 Meiners et al.
2011/0265893 A1* 11/2011 Scott ..................... B01D 46/90
137/544
(Continued)

FOREIGN PATENT DOCUMENTS

CN 102186554 9/2011
CN 107921659 4/2018
(Continued)

OTHER PUBLICATIONS

International Search Report dated Oct. 8, 2019 in International (PCT) Application No. PCT/JP2019/028205, with English translation.
(Continued)

*Primary Examiner* — Mohammad Ali
*Assistant Examiner* — Joshua T Sanders
(74) *Attorney, Agent, or Firm* — Wenderoth, Lind & Ponack, L.L.P.

(57) ABSTRACT

An additive manufacturing device comprises a lower nozzle that blows out inert gas into a chamber in a horizontal direction through a lower opening portion formed in a lower part of a first side wall constituting the chamber, and an upper nozzle that blows out the inert gas into the chamber through an upper opening portion formed in an upper part of the first side wall, wherein the upper nozzle includes a window nozzle that blows out the inert gas along an inner surface of a window portion of a top board constituting the chamber, and an oblique nozzle that blows out the inert gas obliquely downward from the upper portion of the first side wall.

18 Claims, 4 Drawing Sheets

(51) Int. Cl.
*B33Y 30/00* (2015.01)
*B33Y 40/00* (2020.01)

(58) Field of Classification Search
USPC .......................................................... 700/118
See application file for complete search history.

(56) References Cited

U.S. PATENT DOCUMENTS

| | | | |
|---|---|---|---|
| 2015/0367574 A1 | 12/2015 | Araie et al. | |
| 2017/0087635 A1 | 3/2017 | Wilkes et al. | |
| 2018/0043614 A1* | 2/2018 | Greenfield | B29C 64/153 |
| 2018/0126460 A1* | 5/2018 | Murphree | B33Y 40/00 |
| 2018/0236550 A1 | 8/2018 | Herzog | |
| 2018/0244034 A1 | 8/2018 | Sutcliffe et al. | |
| 2018/0333779 A1* | 11/2018 | Sutcliffe | B22F 12/70 |
| 2019/0299289 A1 | 10/2019 | Aota | |

FOREIGN PATENT DOCUMENTS

| | | |
|---|---|---|
| JP | 2016-6215 | 1/2016 |
| JP | 2017-61745 | 3/2017 |
| JP | 2017-538038 | 12/2017 |
| JP | 2018-3148 | 1/2018 |
| JP | 2018-501132 | 1/2018 |
| JP | 2018003148 A * | 1/2018 |
| WO | 2017/013454 | 1/2017 |
| WO | 2017/102384 | 6/2017 |
| WO | 2017/208553 | 12/2017 |
| WO | 2018/086887 | 5/2018 |

OTHER PUBLICATIONS

Written Opinion of the International Searching Authority dated Oct. 8, 2019 in International (PCT) Application No. PCT/JP2019/028205, with English translation.

* cited by examiner

ADDITIVE MANUFACTURING DEVICE

TECHNICAL FIELD

The present invention relates to an additive manufacturing device.

Priority is claimed on Japanese Patent Application No. 2018-137916, filed Jul. 23, 2018, the content of which is incorporated herein by reference.

BACKGROUND ART

An additive manufacturing device is used to melt and sinter a metal material powder by laser light (refer to, for example, PTL 1).

Such an additive manufacturing device includes a chamber, an inert gas supply unit, an inert gas suction unit, a stage, a recoater, an elevating unit, and a laser light irradiation unit.

The inert gas supply unit supplies an inert gas into the chamber. The inert gas suction unit suctions the inert gas and removes fumes.

A powder bed on which a metal powder layer is laminated is formed on an upper surface of the stage. The recoater supplies a metal powder to an upper surface side of the stage to form the metal powder layer. At the time of manufacturing a manufactured product, the elevating unit moves the stage downward. The laser light irradiation unit irradiates the metal powder layer with the laser light to manufacture a manufactured part.

CITATION LIST

Patent Literature

[PTL 1] Japanese Unexamined Patent Application Publication No. 2018-3148

SUMMARY OF INVENTION

Technical Problem

Here, from the viewpoint of improving the productivity of the manufactured product, it is required to increase a laser irradiation area, increase a laser operation speed, or increase melting and sintering amounts to increase a manufacturing volume per unit time. However, as the manufacturing volume per unit time increases, so does the amount of fumes generated. Therefore, the fumes cannot be sufficiently removed, and gases containing the fumes remain in the chamber, so that there is a possibility that the residual gases containing the fumes may interfere with the laser light irradiated by the laser light irradiation unit.

As a result, the laser light passing through the interfering portion may be weakened, resulting in deterioration of the quality of the manufactured product.

Therefore, an object of the present invention is to provide an additive manufacturing device capable of improving the quality of a manufactured product by suppressing fumes in a chamber from interfering with laser light.

Solution to Problem

In order to solve the above problems, an additive manufacturing device according to an aspect of the present invention includes: a chamber which has a first side wall including an upper opening formed in an upper portion and a lower opening formed in a lower portion located below the upper portion, a second side wall disposed so as to face the first side wall and including a discharge port formed so as to face the lower opening, and a top plate provided from an upper end of the first side wall to an upper end of the second side wall and including a window portion capable of transmitting laser light, and defines a space therein; a stage which is provided in the chamber and of which an upper surface side is a manufacturing area; a recoater which is provided in the chamber and supplies a metal powder to an upper surface of the stage; a laser irradiation unit which irradiates the metal powder deposited on the upper surface of the stage with the laser light through the window portion to manufacture a manufactured product; a lower nozzle which ejects an inert gas in a horizontal direction into the chamber through the lower opening; and an upper nozzle which ejects the inert gas into the chamber through the upper opening, in which the upper nozzle has a window portion nozzle that ejects the inert gas along the window portion and an oblique nozzle that ejects the inert gas in an obliquely downward direction from the upper portion of the first side wall.

According to the present invention, by providing the oblique nozzle that ejects the inert gas in the obliquely downward direction from the upper portion of the first side wall in addition to the window portion nozzle (a nozzle for suppressing the adhesion of fumes to an inner surface of the window portion) that ejects the inert gas along the window portion, for example, by ejecting the inert gas from the oblique nozzle in the direction from the upper portion of the first side wall toward the lower portion of the second side wall, a residual gas containing the fumes that has not been discharged from the discharge port and tends to return to the direction toward the laser light from the second side wall side can be guided to the outside of the laser light.

Accordingly, it is possible to suppress the weakening of the laser light by the fumes, so that the quality of the manufactured product can be improved.

In addition, for example, by ejecting the inert gas in the direction from the upper portion of the first side wall toward the upper surface of the stage using the oblique nozzle, it is possible to suppress the residual gas containing the fumes from staying on the upper surface side of the manufacturing area, and it is possible to suppress the upward movement of the gas containing the fumes.

Accordingly, it is possible to suppress the weakening of the laser light by the fumes, so that the quality of the manufactured product can be improved.

In the additive manufacturing device according to the aspect of the present invention, the oblique nozzle may have a first nozzle that has a flow path extending in a first direction from the upper portion of the first side wall toward a lower portion of the second side wall, through which the inert gas flows, and ejects the inert gas in the first direction, and a second nozzle that has a flow path extending in a second direction from the upper portion of the first side wall toward an upper surface of the stage, through which the inert gas flows, and ejects the inert gas in the second direction.

By providing the first nozzle having such a configuration, it is possible to guide the gas containing the fumes that tends to return to the direction toward the laser light from the second side wall side, to a region that does not interfere with the laser light, by the inert gas ejected from the first nozzle.

In addition, by providing the second nozzle having the above configuration, it is possible to suppress the residual gas containing the fumes from staying on the upper surface side of the manufacturing area, and it is possible to suppress the upward movement of the residual gas containing the fumes, by ejecting the inert gas ejected from the second nozzle.

Therefore, by providing the first and second nozzles having the above configuration, it is possible to suppress the weakening of the laser light by the fumes, so that the quality of the manufactured product can be improved.

In the additive manufacturing device according to the aspect of the present invention, a flow rate of the inert gas ejected from the window portion nozzle may be larger than a flow rate of the inert gas ejected from the first nozzle and a flow rate of the inert gas ejected from the second nozzle.

As described above, by causing the flow rate of the inert gas ejected from the window portion nozzle to be larger than the flow rate of the inert gas ejected from the first nozzle and the flow rate of the inert gas ejected from the second nozzle, an effect of guiding the residual gas containing the fumes that tends to return to the direction from the second side wall side toward the laser light to the region that does not interfere with the laser light and causing the residual gas to stay in the region can be enhanced.

In the additive manufacturing device according to the aspect of the present invention, a flow rate of the inert gas ejected from the first nozzle may be larger than a flow rate of the inert gas ejected from the window portion nozzle and a flow rate of the inert gas ejected from the second nozzle.

As described above, by causing the flow rate of the inert gas ejected from the first nozzle to be larger than the flow rate of the inert gas ejected from the window portion nozzle and the flow rate of the inert gas ejected from the second nozzle, the effect of guiding the residual gas containing the fumes that tends to return to the direction from the second side wall side toward the laser light to the region that does not interfere with the laser light and causing the residual gas to stay in the region can be enhanced.

In the additive manufacturing device according to the aspect of the present invention, a flow rate of the inert gas ejected from the second nozzle may be larger than a flow rate of the inert gas ejected from the window portion nozzle and a flow rate of the inert gas ejected from the first nozzle.

As described above, by causing the flow rate of the inert gas ejected from the second nozzle to be larger than the flow rate of the inert gas ejected from the window portion nozzle and the flow rate of the inert gas ejected from the first nozzle, an effect of suppressing the residual gas containing the fumes from staying on the upper surface side of the manufacturing area can be enhanced by the inert gas ejected from the second nozzle.

The additive manufacturing device according to the aspect of the present invention may further include flow rate changing means for causing the flow rates of the inert gases ejected from the first nozzle, the second nozzle, and the window portion nozzle to be different from each other, in which the flow rate changing means may include a configuration in which a height of the flow path of the first nozzle, a height of the flow path of the second nozzle, and a height of the flow path of the window portion nozzle are different from each other.

As described above, by providing the flow rate changing means including the configuration in which the height of the flow path of the first nozzle, the height of the flow path of the second nozzle, and the height of the flow path of the window portion nozzle are different from each other, the flow rate of the inert gas ejected from the window portion nozzle, the flow rate of the inert gas ejected from the first nozzle, and the flow rate of the inert gas ejected from the second nozzle can be different from each other.

The additive manufacturing device according to the aspect of the present invention may further include flow rate changing means for causing the flow rates of the inert gases ejected from the first nozzle, the second nozzle, and the window portion nozzle to be different from each other, in which the flow rate changing means may include a resistance imparting portion that imparts resistance to the inert gas flowing through at least one flow path among the flow path of the first nozzle, the flow path of the second nozzle, and the flow path of the window portion nozzle.

As described above, by providing the flow rate changing means including the resistance imparting portion that imparts resistance to the inert gas that flows through at least one flow path among the flow path of the first nozzle, the flow path of the second nozzle, and the flow path of the window portion nozzle, the flow rate of the inert gas ejected from the window portion nozzle, the flow rate of the inert gas ejected from the first nozzle, and the flow rate of the inert gas ejected from the second nozzle can be different from each other.

The additive manufacturing device according to the aspect of the present invention may further include flow rate changing means for causing the flow rates of the inert gases ejected from the first nozzle, the second nozzle, and the window portion nozzle to be different from each other, in which the flow rate changing means may include a configuration in which a height of the flow path of the first nozzle, a height of the flow path of the second nozzle, and a height of the flow path of the window portion nozzle are different from each other, and a resistance imparting portion that imparts resistance to the inert gas flowing through at least one flow path among the flow path of the first nozzle, the flow path of the second nozzle, and the flow path of the window portion nozzle.

As described above, by providing the flow rate changing means including the configuration in which the height of the flow path of the first nozzle, the height of the flow path of the second nozzle, and the height of the flow path of the window portion nozzle are different from each other, the resistance imparting portion that imparts resistance to the inert gas that flows through at least one flow path among the flow path of the first nozzle, the flow path of the second nozzle, and the flow path of the window portion nozzle, the flow rate of the inert gas ejected from the window portion nozzle, the flow rate of the inert gas ejected from the first nozzle, and the flow rate of the inert gas ejected from the second nozzle can be different from each other.

The additive manufacturing device according to the aspect of the present invention may further include a guide member which is provided in a corner portion defined by an inner surface of a portion in an inner surface of the top plate located on the second side wall side and an upper portion of an inner surface of the second side wall, and is disposed so as not to interfere with an inner surface of the window portion, in which the guide member may have a guide surface that is exposed to the space defined by the chamber, is curved in a direction toward a corner formed by the inner surface of the top plate and the inner surface of the second side wall, and causes the inert gas ejected from the window portion nozzle to flow along the guide surface.

By disposing the guide member having the above configuration at the corner portion in the chamber, it is possible to suppress the residual gas containing the fumes from staying in the region in which the guide member is disposed in the space S inside the chamber.

In addition, by providing the guide surface that guides the inert gas ejected from the window portion nozzle, it is possible to cause the residual gas containing the fumes to stay on the outside of the laser light and near the lower portion of the second side wall, using the inert gas ejected from the window portion nozzle.

Accordingly, it is possible to suppress the weakening of the laser light by the fumes, so that the quality of the manufactured product can be improved.

Advantageous Effects of Invention

According to the present invention, the quality of the manufactured product can be improved by suppressing the interference between the residual gas containing the fumes and the laser light.

DESCRIPTION OF EMBODIMENTS

Hereinafter, embodiments to which the present invention is applied will be described in detail with reference to the drawings.

First Embodiment

An additive manufacturing device 10 according to a first embodiment of the present invention will be described with reference to FIGS. 1 to 3.

Figure 1:
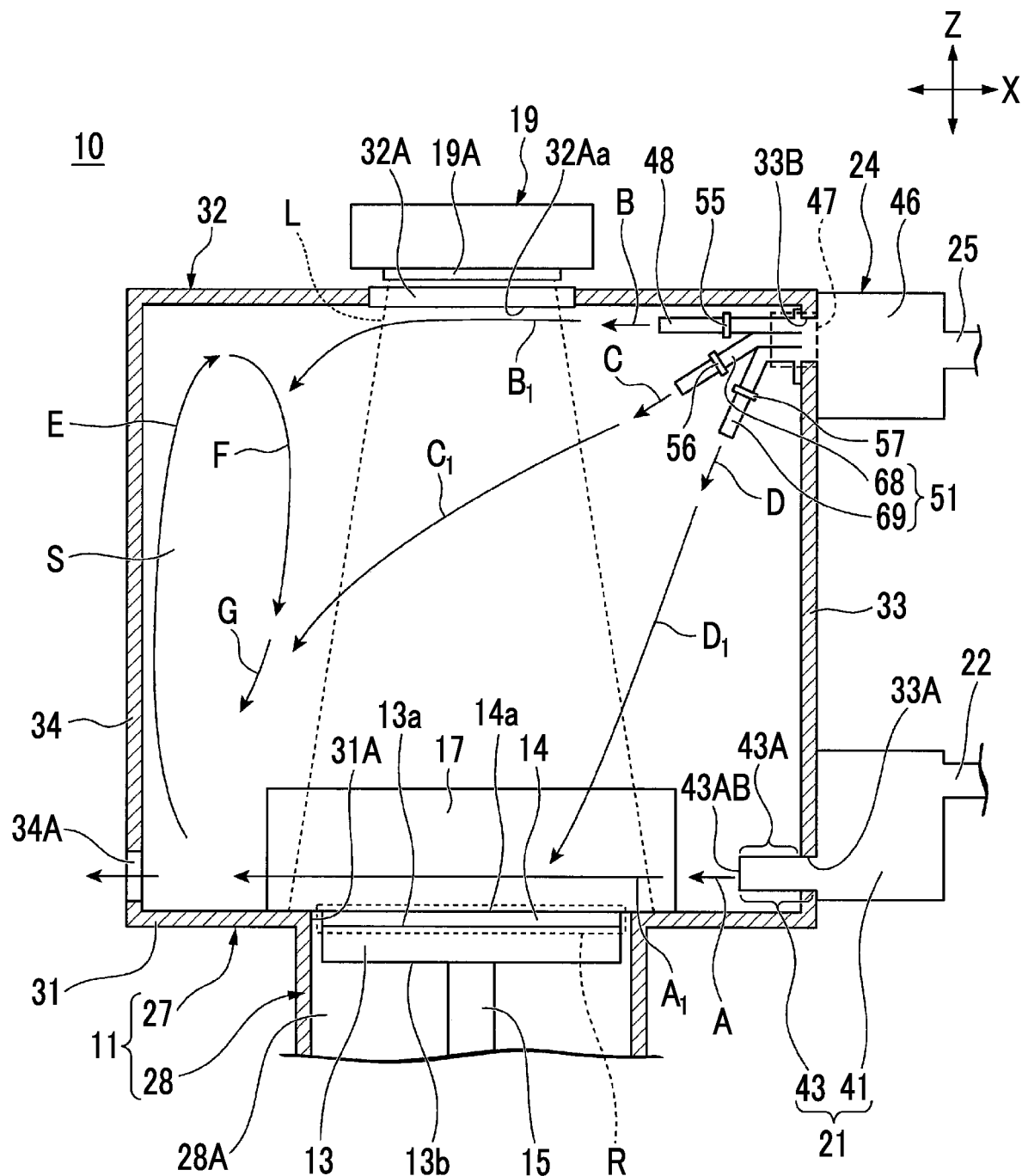
FIG. 1 is a cross-sectional view schematically illustrating a schematic configuration of an additive manufacturing device according to a first embodiment of the present invention.

In FIG. 1, A indicates a direction in which a lower nozzle 21 ejects an inert gas (hereinafter, referred to as "A direction"), and $A_1$ indicates a direction in which the inert gas ejected from the lower nozzle 21 flows (hereinafter, referred to as "$A_1$ direction").

In FIG. 1, B indicates a direction in which a window portion nozzle 48 ejects the inert gas (hereinafter, referred to as "B direction"), and $B_1$ indicates a direction in which the inert gas ejected from the window portion nozzle 48 flows (hereinafter, referred to as "$B_1$ direction").

In FIG. 1, C indicates a direction in which a first nozzle 68 ejects the inert gas and also a direction in which a flow path 68A of the first nozzle 68 extends (hereinafter, referred to as "first direction C"), $C_1$ indicates a direction in which the inert gas ejected from the first nozzle 68 flows (hereinafter, referred to as "$C_1$ direction"), D indicates a direction in which a second nozzle 69 ejects the inert gas and also a direction in which a flow path 69A of the second nozzle 69 extends (hereinafter, referred to as "second direction D"), and $D_1$ indicates a direction in which the inert gas ejected from the second nozzle 69 flows (hereinafter, referred to as "$D_1$ direction").

In FIG. 1, E schematically indicates a direction in which a residual gas of the inert gas containing fumes that has not been discharged from a discharge port 34A flows (hereinafter, referred to as "E direction"), F schematically indicates a direction in which the residual gas containing fumes flows after being changed in a flow direction by the inert gas ejected from the window portion nozzle 48 (hereinafter, referred to as "F direction"), G schematically indicates a flow direction of the residual gas containing fumes after the flow direction of the residual gas flowing in the F direction is changed by the inert gas ejected from the first nozzle 68 (hereinafter, referred to as "G direction"), and L schematically indicates laser light emitted from a laser irradiation unit 19.

In FIG. 1, an X direction indicates a direction in which a first side wall 33 and a second side wall 34 forming a chamber 11 face each other (a depth direction of the chamber 11), and a Z direction indicates a vertical direction orthogonal to the X direction.

Figure 2:
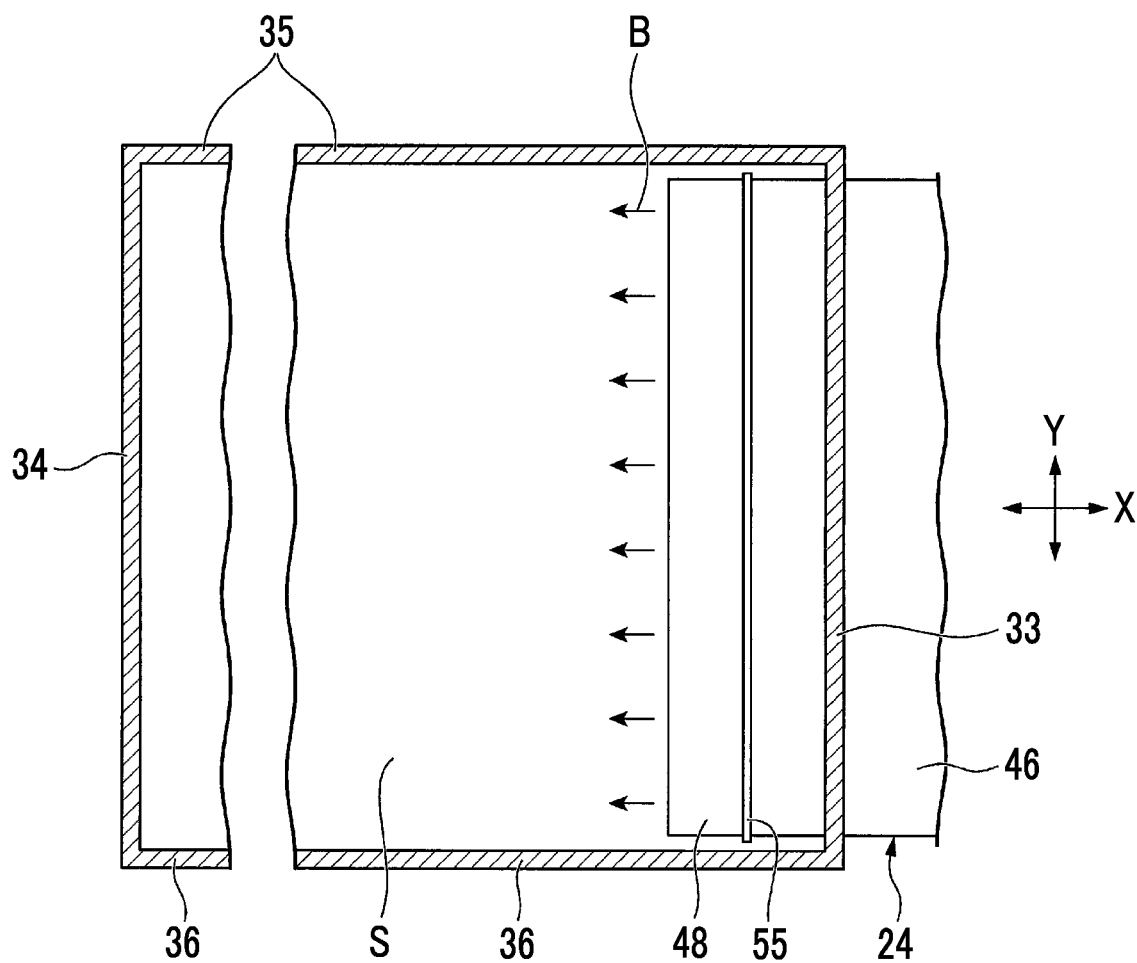
FIG. 2 is a plan view of a window portion nozzle from an upper surface side in a state where a top plate illustrated in FIG. 1 is removed.

In FIG. 2, a Y direction indicates a direction orthogonal to the X direction and the Z direction, and also a direction in which a third side wall 35 and a fourth side wall 36 forming the chamber 11 face each other (a width direction of the chamber 11).

Figure 3:
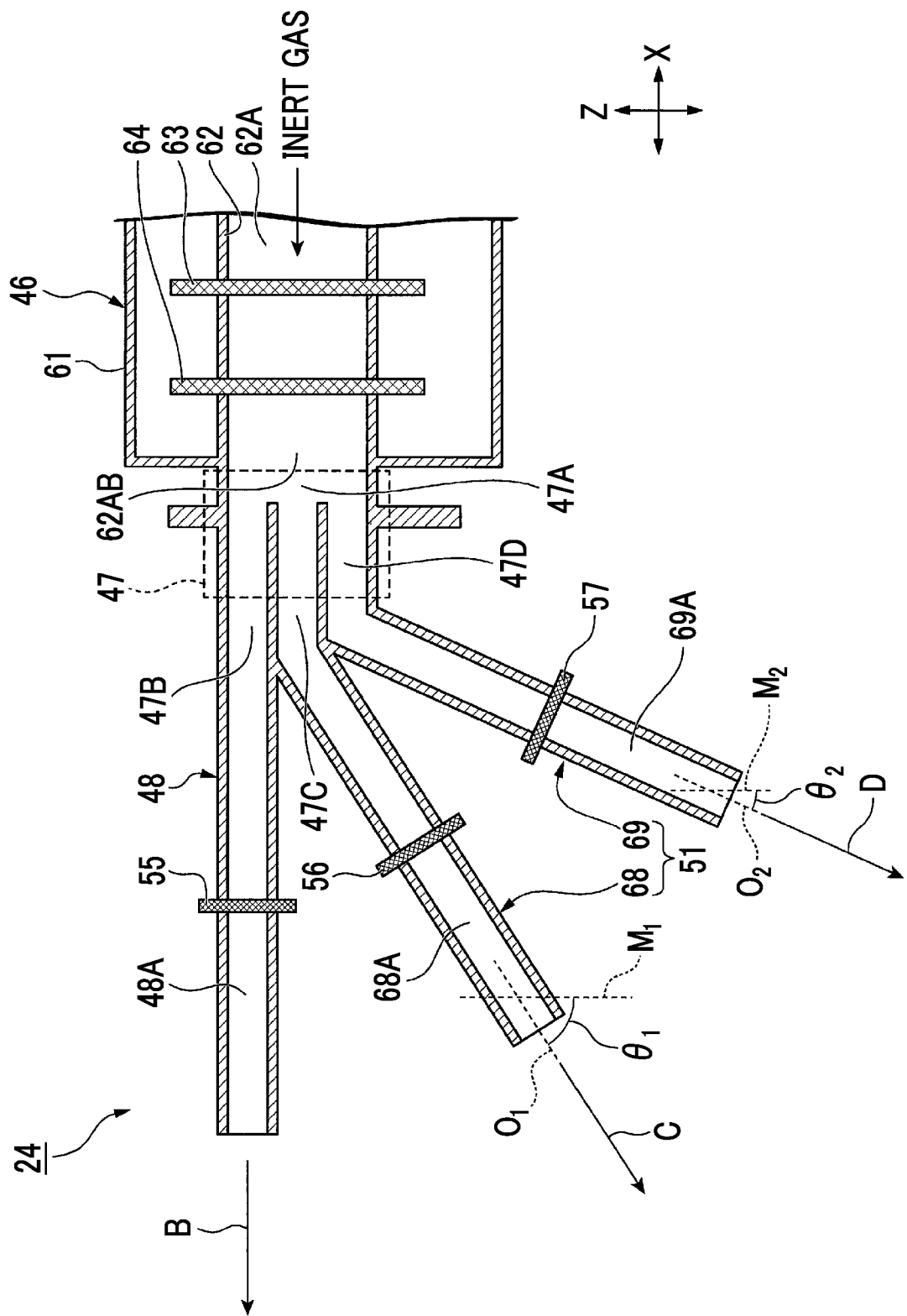
FIG. 3 is a cross-sectional view of an upper nozzle illustrated in FIG. 1 when cut in an XZ plane.

In FIGS. 1 to 3, like constituent parts are denoted by like reference numerals.

The additive manufacturing device 10 includes the chamber 11, a stage 13, a support member 15, an elevating drive unit (not illustrated), a recoater 17, the laser irradiation unit 19, the lower nozzle 21, inert gas supply lines 22 and 25, and an upper nozzle 24.

The chamber 11 has a chamber body 27 and an elevating mechanism accommodation portion 28. The chamber body 27 has a bottom plate 31, a top plate 32, and the first to fourth side walls 33 to 36.

The bottom plate 31 is formed with an opening 31A in the center portion for accommodating the stage 13.

The top plate 32 is disposed so as to face the bottom plate 31 in the Z direction in a state of being separated above the bottom plate 31. The top plate 32 has a window portion 32A capable of transmitting the laser light L in the center portion.

An inner surface 32Aa of the window portion 32A is exposed to a space S.

The first to fourth side walls 33 to 36 are disposed between the bottom plate 31 and the top plate 32. The first and second side walls 33 and 34 are disposed so as to face each other in the X direction in a state of being separated from each other.

The lower ends of the first and second side walls 33 and 34 are each connected to the outer peripheral edge of the bottom plate 31. The upper ends of the first and second side walls 33 and 34 are each connected to the outer peripheral edge of the top plate 32.

A lower opening 33A and an upper opening 33B are formed in the first side wall 33. The lower opening 33A is formed in a portion of the lower portion of the first side wall 33 close to the bottom plate 31. The lower opening 33A is a rectangular opening extending in the Y direction.

The upper opening 33B is formed in a portion of the upper portion of the first side wall 33 close to the top plate 32. The upper opening 33B is a rectangular opening extending in the Y direction.

The discharge port 34A is formed in the second side wall 34. The discharge port 34A is a rectangular opening extending in the Y direction. The discharge port 34A is formed so as to face the lower opening 33A in the X direction.

The third and fourth side walls 35 and 36 are disposed so as to face each other in the Y direction in a state of being separated from each other. The lower ends of the third and fourth side walls 35 and 36 are each connected to the outer peripheral edge of the bottom plate 31. The upper ends of the third and fourth side walls 35 and 36 are each connected to the outer peripheral edge of the top plate 32. One side ends of the third and fourth side walls 35 and 36 in the X direction are each connected to the second side wall 34. The other side ends of the third and fourth side walls 35 and 36 in the X direction are each connected to the first side wall 33.

The upper ends of the first to fourth side walls 33 to 36 having the above configuration are connected to the top plate 32. Accordingly, the top plate 32 is provided from the upper end of the first side wall 33 to the upper end of the second side wall 34.

The elevating mechanism accommodation portion 28 is disposed below the chamber body 27. The upper end of the elevating mechanism accommodation portion 28 is connected to the inner edge of the bottom plate 31. The elevating mechanism accommodation portion 28 defines a columnar space 28A therein. The columnar space 28A is sized to accommodate the stage 13.

The stage 13 is a plate-shaped member and has an upper surface 13a and a lower surface 13b. The upper surface 13a is a flat surface. On the upper surface 13a, a powder laminated portion 14 formed by deposition of a metal powder is disposed. The powder laminated portion 14 serves as a material for forming a manufactured product.

When the powder laminated portion 14 is irradiated with the laser light L to melt and sinter the metal powder, the stage 13 moves downward by the thickness of the layer on which the metal powder is deposited. Then, after forming a new metal powder layer, when the metal powder layer is irradiated with the laser light L to melt the metal powder and sinter the metal powder, the stage 13 moves downward by the thickness of the metal powder layer.

That is, the stage 13 moves downward little by little as the processing by the laser light L progresses.

A manufacturing area R in which a manufactured product is manufactured is disposed on the upper surface 13a of the stage 13 and a region above the upper surface 13a.

The support member 15 extends downward from the stage 13 (toward one side in the Z direction) in a state where one end thereof is connected to the lower surface 13b side of the stage 13.

The elevating drive unit (not illustrated) is a drive unit for moving the support member 15 in the Z direction.

The recoater 17 is accommodated in the chamber body 27. The recoater 17 is disposed above the bottom plate 31. The recoater 17 is configured to be movable in the Y direction.

The recoater 17 drops the metal powder onto the manufacturing area R on the stage 13 while moving in the Y direction to form a metal powder layer. During the irradiation of the laser light L, the recoater 17 stands by outside the manufacturing area R.

The laser irradiation unit 19 is disposed above the window portion 32A of the top plate 32. The laser irradiation unit 19 has an irradiation unit 19A that irradiates the laser light L. The irradiation unit 19A is disposed so as to face the window portion 32A in the Z direction.

The laser irradiation unit 19 having the above configuration melts the metal powder by irradiating the metal powder layer formed on the upper surface 13a of the stage 13 with the laser light L.

The manufactured product is manufactured by solidifying the metal powder melted by the laser light L emitted from the laser irradiation unit 19.

In order to increase the manufacturing volume per unit time, a laser irradiation area is expanded, a laser operation speed is increased, or melting and sintering amounts are increased.

The lower nozzle 21 has a header part 41 and a nozzle body 43.

The header part 41 is disposed outside the first side wall 33 forming the chamber 11. The header part 41 extends in the Y direction.

A portion of the header part 41 located on one side in the X direction is connected to the nozzle body 43, and the other side thereof in the X direction is connected to the inert gas supply line 22.

The header part 41 having the above configuration straightens the inert gas (for example, Ar gas) supplied from the inert gas supply line 22 in a direction toward the nozzle body 43, and thereafter supplies the inert gas to the nozzle body 43.

The nozzle body 43 is fixed to the chamber body 27 in a state of being inserted into the lower opening 33A. A tip portion 43A of the nozzle body 43 is disposed in the chamber body 27 and has an ejection port 43AB through which the inert gas is ejected. The ejection port 43AB is disposed so as to face the discharge port 34A.

The inert gas ejected from the ejection port 43AB flows in the $A_1$ direction toward the discharge port 34A along the upper surface 14a of the powder laminated portion 14. At this time, the inert gas flows in the $A_1$ direction together with fumes.

A portion of the inert gas containing the fumes flowing in the $A_1$ direction is discharged from the discharge port 34A to the outside of the chamber body 27, and the inert gas flows in the E direction as residual gas that has not been discharged to the outside of the chamber body 27 from the discharge port 34A.

The inert gas supply line 22 is provided outside the chamber 11. The inert gas supply line 22 is a line for supplying the inert gas into the header part 41.

The upper nozzle 24 has a header part 46, a gas distribution portion 47, the window portion nozzle 48, an oblique nozzle 51, a straightening member 55, a first straightening member 56, and a second straightening member 57.

The header part 46 includes a housing 61, an inert gas guide member 62, and straightening members 63 and 64.

The housing 61 is disposed outside the upper opening 33B and extends in the Y direction. An end portion of the housing 61 located on the other side in the X direction is connected to the inert gas supply line 25.

The inert gas guide member 62 is accommodated in the housing 61. The inert gas guide member 62 extends in the Y direction. The inert gas guide member 62 has a flow path 62A therein through which the inert gas flows.

One end portion of the inert gas guide member 62 located on one side in the X direction is connected to the housing 61 in a state in which the inert gas can be introduced into an introduction port 47A of the gas distribution portion 47.

The other end portion of the inert gas guide member 62 located on the other side in the X direction is connected to the housing 61 in a state where the inert gas supplied from the outlet of the inert gas supply line 25 can flow into the flow path 62A.

The straightening member 63 is provided in the inert gas guide member 62 so as to face the flow path 62A in the X direction. As the straightening member 63, for example, a metal mesh, a porous plate, or a honeycomb structure can be used.

The straightening member 64 is provided in the inert gas guide member 62 so as to face the flow path 62A in the X direction. The straightening member 64 is disposed between the straightening member 63 and the gas distribution portion 47. The straightening member 64 is disposed downstream of the straightening member 63. The straightening member 64 has the same configuration as the straightening member 63 described above.

By providing the straightening members 63 and 64 having the above configuration, it is possible to uniformize the flow speed distribution of the inert gas supplied into the header part 46 and to straighten the flow direction in the X direction.

The gas distribution portion 47 is provided between the window portion nozzle 48, the oblique nozzle 51, and the header part 46. The gas distribution portion 47 extends in the Y direction.

The gas distribution portion 47 has an introduction port 47A, an upper flow path 47B, an intermediate flow path 47C, and a lower flow path 47D.

The introduction port 47A communicates with a lead-out port 62AB of the flow path 62A on the other side in the X direction, and communicates with each inlet of the upper flow path 47B, the intermediate flow path 47C, and the lower flow path 47D on one side in the X direction.

The intermediate flow path 47C is a flow path disposed between the upper flow path 47B and the lower flow path 47D in the Z direction. The upper flow path 47B is a flow path disposed above the intermediate flow path 47C. The lower flow path 47D is a flow path disposed below the intermediate flow path 47C.

The window portion nozzle 48 is disposed in the chamber body 27 and extends in the B direction (X direction). The window portion nozzle 48 has a flow path 48A extending in the B direction.

The window portion nozzle 48 is provided in the gas distribution portion 47 so that the rear end of the flow path 48A communicates with the lead-out port of the upper flow path 47B.

The window portion nozzle 48 having the above configuration ejects the inert gas in the B direction from the ejection port (tip) of the flow path 48A.

The inert gas ejected from the window portion nozzle 48 flows along the inner surface 32Aa of the window portion 32A, and thereafter flows obliquely downward toward the second side wall 34. That is, the inert gas ejected from the window portion nozzle 48 flows in a direction along the top plate 32 (the $B_1$ direction shown in FIG. 1).

At this time, the inert gas flowing in the $B_1$ direction changes the gas flow direction so that the residual gas containing the fumes flowing in the E direction is directed toward the F direction away from an optical path of the laser light L.

Accordingly, it is possible to suppress the interference of the residual gas containing the fumes with an upper portion of the laser light L (it is possible to suppress the weakening of the laser light L by the fumes), so that the quality of the manufactured product can be improved.

The oblique nozzle 51 has the first nozzle 68 and the second nozzle 69.

The first nozzle 68 is disposed in the chamber body 27 and extends in the first direction C (the direction from the upper portion of the first side wall 33 to the lower portion of the second side wall 34) inclined with respect to the X direction and the Z direction. An angle formed by an axis $O_1$ of the first nozzle 68 and a virtual straight line $M_1$ extending in the Z direction is an angle $\theta_1$.

The first nozzle 68 has the flow path 68A extending in the first direction C. The width of the first nozzle 68 in the Y direction is formed to be equal to the width of the gas distribution portion 47 in the Y direction.

The first nozzle 68 is provided in the gas distribution portion 47 so that the rear end of the flow path 68A communicates with the lead-out port of the intermediate flow path 47C.

The first nozzle 68 having the above configuration ejects the inert gas in the first direction C from the ejection port (tip) of the flow path 68A.

The inert gas ejected from the first nozzle 68 flows in the $C_1$ direction from the upper portion of the first side wall 33 toward the lower portion of the second side wall 34.

At this time, the inert gas flowing in the $C_1$ direction changes the gas flow direction so that the residual gas containing the fumes flowing in the F direction is directed toward the G direction away from the optical path of the laser light L.

Accordingly, it is possible to suppress the interference of the residual gas containing the fumes with the optical path of the laser light L (it is possible to suppress the weakening of the laser light L by the fumes), so that the quality of the manufactured product can be improved.

By providing the window portion nozzle 48 that ejects the inert gas in the B direction and the first nozzle 68 that ejects the inert gas in the first direction C, it is possible to cause the inert gas containing the fumes to stay in the space S located between the second side wall 34 and the laser light L.

Accordingly, it is possible to suppress the interference between the residual gas containing the fumes and the laser light L, so that the quality of the manufactured product can be improved.

The second nozzle 69 is disposed in the chamber body 27, and extends in the second direction D (the direction from the upper portion of the first side wall 33 toward the upper surface 13a of the stage 13) inclined with respect to the X direction and the Z direction. An angle formed by an axis $O_2$ of the second nozzle 69 and a virtual straight line $M_2$ extending in the Z direction is an angle $\theta_2$ smaller than the angle $\theta_1$.

The second nozzle 69 has the flow path 69A extending in the second direction D. The width of the second nozzle 69 in the Y direction is formed to be equal to the width of the gas distribution portion 47 in the Y direction.

The second nozzle 69 is provided in the gas distribution portion 47 so that the rear end of the flow path 69A communicates with the lead-out port of the intermediate flow path 47C.

The second nozzle 69 having the above configuration ejects the inert gas in the second direction D from the ejection port (tip) of the flow path 69A.

The inert gas ejected from the second nozzle 69 flows in the $D_1$ direction from the upper portion of the first side wall 33 toward the upper surface 13a of the stage 13.

At this time, with the inert gas flowing in the $D_1$ direction, it is possible to suppress the upward movement of the inert gas containing the fumes flowing in the $A_1$ direction, and it is possible to suppress the residual gas containing the fumes from staying in the region above the upstream side of the manufacturing area R.

Accordingly, it is possible to suppress the interference between the residual gas containing the fumes and the laser light L, so that the quality of the manufactured product can be improved.

The heights of the flow paths of the window portion nozzle 48, the first nozzle 68, and the second nozzle 69 described above can be, for example, the same height.

The straightening member 55 is provided in the window portion nozzle 48 so as to face the flow path 48A in the B direction. The straightening member 55 is provided at an intermediate position of the window portion nozzle 48.

The straightening member 55 is formed of a metal mesh, a porous plate, a honeycomb structure, or the like.

By providing the straightening member 55, the direction in which the inert gas flows after passing through the straightening member 55 can be aligned with the B direction.

The straightening member 55 may be provided upstream of the ejection port of the window portion nozzle 48, and is not limited to the intermediate position of the window portion nozzle 48.

The first straightening member 56 is provided in the first nozzle 68 so as to face the flow path 68A in the first direction C. The first straightening member 56 is provided at an intermediate position of the first nozzle 68. The first straightening member 56 has the same configuration as the straightening member 55 described above.

By providing the first straightening member 56 having such a configuration, the direction in which the inert gas flows after passing through the first straightening member 56 can be aligned with the first direction C.

The first straightening member 56 may be provided upstream of the ejection port of the first nozzle 68, and is not limited to the intermediate position of the first nozzle 68.

The second straightening member 57 is provided in the second nozzle 69 so as to face the flow path 69A in the second direction D. The second straightening member 57 is provided at an intermediate position of the second nozzle 69. The second straightening member 57 has the same configuration as the straightening member 55 described above.

By providing the second straightening member 57 having such a configuration, the direction in which the inert gas flows after passing through the second straightening member 57 can be aligned with the second direction D.

The second straightening member 57 may be provided upstream of the ejection port of the second nozzle 69, and is not limited to the intermediate position of the second nozzle 69.

According to the additive manufacturing device 10 of the first embodiment, by providing the first nozzle 68 that ejects the inert gas in the obliquely downward direction (the first direction C) from the upper portion of the first side wall 33 in addition to the window portion nozzle 48 that ejects the inert gas along the inner surface 32Aa of the window portion 32A, the inert gas is caused to flow in the direction from the upper portion of the first side wall 33 toward the lower portion of the second side wall 34 via the first nozzle 68, and the residual gas containing the fumes that has not been discharged from the discharge port 34A and tends to return to the direction toward the laser light L from the second side wall 34 side is guided to the outside of the optical path of the laser light L, whereby it is possible to suppress the interference between the residual gas containing the fumes and the laser light L.

Accordingly, it is possible to suppress the weakening of the laser light by the fumes, so that the quality of the manufactured product can be improved.

Furthermore, by providing the second nozzle 69 that ejects the inert gas in the direction (the second direction D) from the upper portion of the first side wall 33 toward the upper surface 13a of the stage 13, it is possible to suppress the gas containing the fumes from staying on the upper surface side of the manufacturing area R, and it is possible to suppress the upward movement of the residual gas containing the fumes.

Accordingly, it is possible to suppress the weakening of the laser light by the fumes, so that the quality of the manufactured product can be improved.

In the first embodiment, the case where the oblique nozzle 51 is formed of two nozzles (specifically, the first and second nozzles 68 and 69) has been described as an example, but the number of nozzles forming the oblique nozzle 51 may be one or more and is not limited to two.

In addition, the magnitudes of the angle $\theta_1$ that determines the first direction C and the angle $\theta_2$ that determines the second direction D can be appropriately set.

Moreover, flow rate changing means may be provided, and the flow rate of the inert gas ejected from the window portion nozzle 48 may be made to be larger than the flow rate of the inert gas ejected from the first nozzle 68 and the flow rate of the inert gas ejected from the second nozzle 69 by the flow rate changing means.

As described above, by causing the flow rate of the inert gas ejected from the window portion nozzle 48 to be larger than the flow rate of the inert gas ejected from the first nozzle 68 and the flow rate of the inert gas ejected from the second nozzle 69, an effect of guiding the residual gas containing the fumes that tends to return to the direction from the second side wall 34 side toward the laser light L to a region that does not interfere with the laser light L and causing the residual gas to stay in the region can be enhanced.

In addition, for example, flow rate changing means may be provided, and the flow rate of the inert gas ejected from the first nozzle 68 may be caused to be larger than the flow rate of the inert gas ejected from the window portion nozzle 48 and the flow rate of the inert gas ejected from the second nozzle 69 by the flow rate changing means.

As described above, by causing the flow rate of the inert gas ejected from the first nozzle 68 to be larger than the flow rate of the inert gas ejected from the window portion nozzle 48 and the flow rate of the inert gas ejected from the second nozzle 69, the effect of guiding the residual gas containing the fumes that tends to return to the direction from the second side wall 34 side toward the laser light L to the region that does not interfere with the laser light L and causing the residual gas to stay in the region can be enhanced.

In addition, for example, flow rate changing means may be provided, and the flow rate of the inert gas ejected from the second nozzle 69 may be caused to be larger than the flow rate of the inert gas ejected from the window portion nozzle 48 and the flow rate of the inert gas ejected from the first nozzle 68 by the flow rate changing means.

As described above, by causing the flow rate of the inert gas ejected from the second nozzle 69 to be larger than the flow rate of the inert gas ejected from the window portion nozzle 48 and the flow rate of the inert gas ejected from the first nozzle 68, an effect of suppressing the residual gas containing the fumes from staying on the upper surface side of the manufacturing area R can be enhanced by the inert gas ejected from the second nozzle 69.

For example, the flow rate changing means may include a configuration in which the height of the flow path 68A of the first nozzle 68, the height of the flow path 69A of the second nozzle 69, and the height of the flow path 48A of the window portion nozzle 48 are different from each other.

As described above, by providing the flow rate changing means including the configuration in which the height of the flow path 68A of the first nozzle 68, the height of the flow path 69A of the second nozzle 69, and the height of the flow path 48A of the window portion nozzle 48 are different from each other, the flow rate of the inert gas ejected from the window portion nozzle 48, the flow rate of the inert gas ejected from the first nozzle 68, and the flow rate of the inert gas ejected from the second nozzle 69 can be different from each other.

Furthermore, the flow rate changing means may include, for example, a resistance imparting portion that imparts resistance to the inert gas that flows through at least one flow path among the flow path 68A of the first nozzle 68, the flow path 69A of the second nozzle 69, and the flow path 48A of the window portion nozzle 48.

As described above, by providing the flow rate changing means including the resistance imparting portion that imparts resistance to the inert gas that flows through at least one flow path among the flow path 68A of the first nozzle 68, the flow path 69A of the second nozzle 69, and the flow path 48A of the window portion nozzle 48, the flow rate of the inert gas ejected from the window portion nozzle 48, the flow rate of the inert gas ejected from the first nozzle 68, and the flow rate of the inert gas ejected from the second nozzle 69 can be different from each other.

As the resistance imparting portion, a straightening member such as a metal mesh, a porous plate, or a honeycomb structure can be used. It is also possible to allow the resistance imparting portion to have the effects of both resistance impartment and straightening.

Moreover, the flow rate changing means may have the configuration in which the height of the flow path 68A of the first nozzle 68, the height of the flow path 69A of the second nozzle 69, and the height of the flow path 48A of the window portion nozzle 48 are different from each other, and the configuration including the resistance imparting portion that imparts resistance to the inert gas that flows through at least one flow path among the flow path 68A of the first nozzle 68, the flow path 69A of the second nozzle 69, and the flow path 48A of the window portion nozzle 48.

By providing the flow rate changing means having such configurations, the flow rate of the inert gas ejected from the window portion nozzle 48, the flow rate of the inert gas ejected from the first nozzle 68, and the flow rate of the inert gas ejected from the second nozzle 69 can be different from each other.

Second Embodiment

Figure 4:
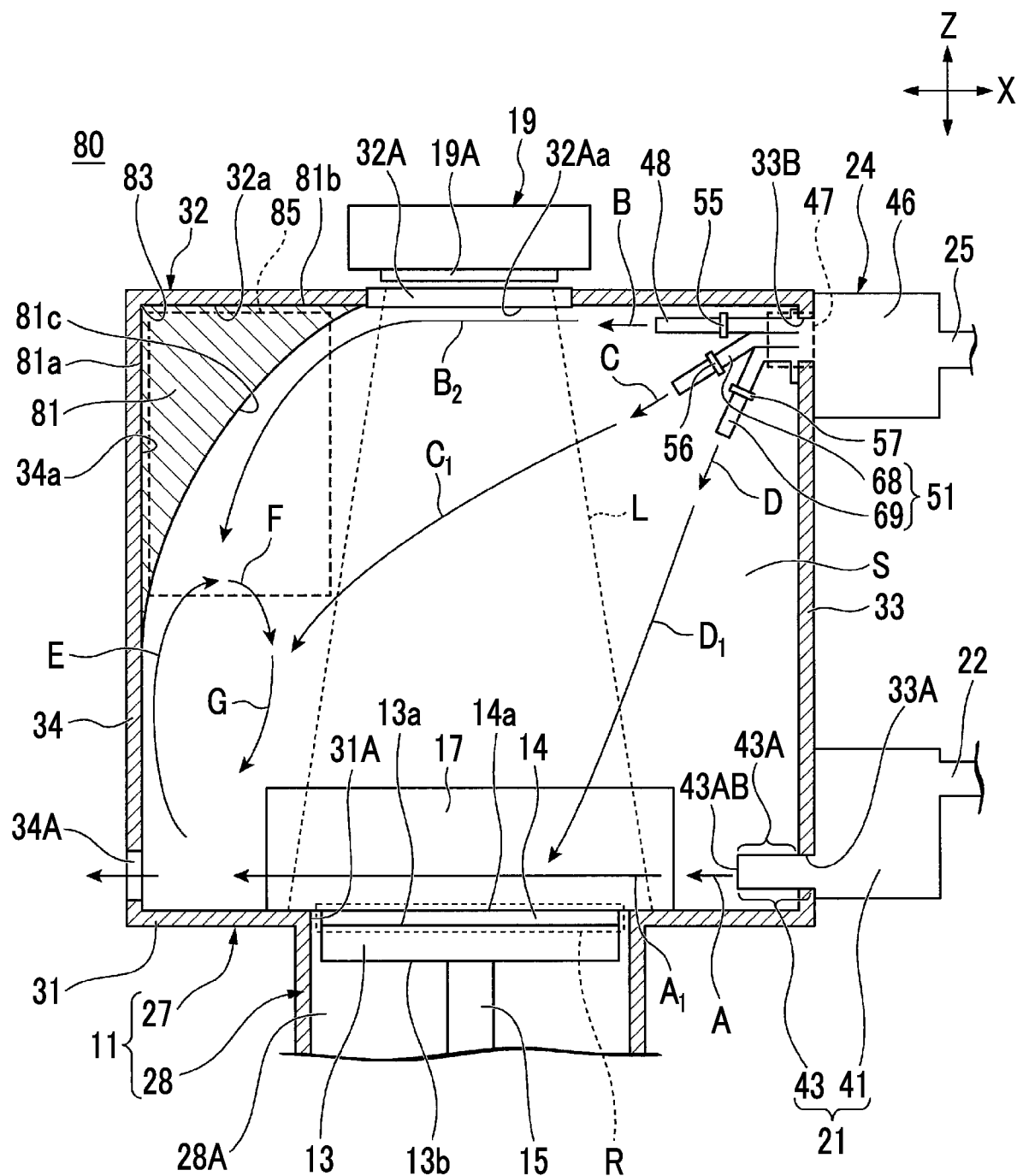
FIG. 4 is a cross-sectional view schematically illustrating a schematic configuration of an additive manufacturing device according to a second embodiment of the present invention.

An additive manufacturing device 80 according to a second embodiment of the present invention will be described with reference to FIG. 4. In FIG. 4, like constituent parts that are the same as those in the structure illustrated in FIG. 1 are denoted by like reference numerals.

The additive manufacturing device 80 of the second embodiment is configured in the same manner as the additive manufacturing device 10 except that a guide member 81 is further provided in the configuration of the additive manufacturing device 10 of the first embodiment.

The guide member 81 is provided in a corner portion 85 defined by an inner surface of a portion in the inner surface 32a of the top plate 32 located on the second side wall 34 side, and an inner surface 34a of an upper portion of the second side wall 34.

The guide member 81 is disposed so as not to interfere with the inner surface 32Aa of the window portion 32A. The guide member 81 is a member extending in a direction orthogonal to an XZ plane (Y direction shown in FIG. 2).

The guide member 81 has a first surface 81a, a second surface 81b, and a guide surface 81c. The first surface 81a is a flat surface orthogonal to the X direction. The first surface 81a is in contact with the upper portion of the inner surface 34a of the second side wall 34.

The second surface 81b is a flat surface orthogonal to the Z direction. The second surface 81b is in contact with the inner surface 32a of the top plate 32.

One side end of the second surface 81b in the X direction is connected to the upper end of the first surface 81a.

The guide surface 81c is a surface connecting the lower end of the first surface 81a and the other side end of the second surface 81b in the X direction. The guide surface 81c is a surface exposed to the space S.

The guide surface 81c is curved in a direction toward a corner 83 formed by the inner surface 32a of the top plate 32 and the inner surface 34a of the second side wall 34. Accordingly, the guide surface 81c is a curved surface. The guide surface 81c is a surface along which the inert gas ejected from the window portion nozzle 48 flows.

According to the additive manufacturing device 80 of the second embodiment, by providing the guide member 81 having the above configuration at the corner portion 85 in the chamber body 27, it is possible to suppress the residual gas containing the fumes from staying in the region in which the guide member 81 is disposed in the space S inside the chamber body 27.

In addition, by providing the guide surface that guides the inert gas ejected from the window portion nozzle, it is possible to cause the residual gas containing the fumes to stay on the outside of the laser light L and near the lower portion of the second side wall 34, using the inert gas ejected from the window portion nozzle 48.

Accordingly, it is possible to suppress the weakening of the laser light by the fumes, so that the quality of the manufactured product can be improved.

While the preferred embodiments of the present invention have been described above in detail, the present invention is not limited to these specific embodiments, and various modifications and changes are possible within the scope of the gist of the present invention described in the claims.

INDUSTRIAL APPLICABILITY

The present invention is applicable to an additive manufacturing device.

REFERENCE SIGNS LIST 10, 80: Additive manufacturing device
11: Chamber
13: Stage
13a, 14a: Upper surface
13b: Lower surface
14: Powder laminated portion
15: Support member
17: Recoater
19: Laser irradiation unit
19A: Irradiation unit
21: Lower nozzle
22, 25: Inert gas supply line
24: Upper nozzle
27: Chamber body
28: Elevating mechanism accommodation portion
28A: Columnar space
31: Bottom plate
31A: Opening 32: Top plate
32a, 32Aa, 34a: Inner surface
32A: Window portion
33: First side wall
33A: Lower opening
33B: Upper opening
34: Second side wall
34A: Discharge port
35: Third side wall
36: Fourth side wall
41, 46: Header part
43: Nozzle body
43A: Tip portion
43AB: Ejection port
47: Gas distribution portion
47A: Introduction port
47B: Upper flow path
47C: Intermediate flow path
47D: Lower flow path
48: Window portion nozzle
48A, 62A, 68A, 69A: Flow path
51: Oblique nozzle
55, 63, 64: Straightening member
56: First straightening member
57: Second straightening member
61: Housing
62: Inert gas guide member
62AB: Lead-out port
68: First nozzle
69: Second nozzle
81: Guide member
81a: First surface
81b: Second surface
81c: Guide surface
83: Corner
85: Corner portion
A, $A_1$, B, $B_1$, $C_1$, $D_1$, E, F, G: Direction
C: First direction
D: Second direction
L: Laser light
$M_1$, $M_2$: Virtual straight line
$O_1$, $O_2$: Axis
R: Manufacturing area
S: Space
$\theta_1$, $\theta_2$: Angle

The invention claimed is:

1. An additive manufacturing device comprising:
a chamber which has a first side wall including an upper opening formed in an upper portion and a lower opening formed in a lower portion located below the upper portion, a second side wall disposed so as to face the first side wall and including a discharge port formed so as to face the lower opening, and a top plate provided from an upper end of the first side wall to an upper end of the second side wall and including a window portion capable of transmitting laser light, and defines a space therein;
a stage which is provided in the chamber and of which an upper surface side is a manufacturing area;
a recoater which is provided in the chamber and supplies a metal powder to an upper surface of the stage;
a laser irradiation unit which irradiates the metal powder deposited on the upper surface of the stage with the laser light through the window portion to manufacture a manufactured product;
a lower nozzle which ejects an inert gas in a horizontal direction into the chamber through the lower opening; and
an upper nozzle which ejects the inert gas into the chamber through the upper opening,
wherein the upper nozzle has
a window portion nozzle that ejects the inert gas along the window portion, and
an oblique nozzle that ejects the inert gas in an obliquely downward direction from the upper portion of the first side wall,
wherein any inert gas ejected from the lower nozzle that is not discharged from the discharge port flows, as residual inert gas, in a first direction toward the top plate along the second side wall,
the window portion nozzle is configured to eject the inert gas such that the flow of residual inert gas flowing in the first direction is changed to flow in a second direction by the inert gas ejected from the window portion nozzle, and
the ejection direction of the oblique nozzle is set such that the flow of the residual inert gas flowing in the second direction is changed to flow in a third direction by at least a portion of the inert gas ejected from the oblique nozzle, the third direction extending away from an optical path of the laser light and toward the second side wall.

2. The additive manufacturing device according to claim 1,
wherein the oblique nozzle has
a first nozzle that has a flow path extending in a first oblique direction from the upper portion of the first side wall toward a lower portion of the second side wall, through which the inert gas flows, and ejects the inert gas in the first oblique direction and
a second nozzle that has a flow path extending in a second oblique direction from the upper portion of the first side wall toward an upper surface of the stage, through which the inert gas flows, and ejects the inert gas in the second oblique direction.

3. The additive manufacturing device according to claim 2,
wherein a flow rate of the inert gas ejected from the window portion nozzle is larger than a flow rate of the inert gas ejected from the first nozzle and a flow rate of the inert gas ejected from the second nozzle.

4. The additive manufacturing device according to claim 3, further comprising:
flow rate changing means for causing the flow rates of the inert gases ejected from the first nozzle, the second nozzle, and the window portion nozzle to be different from each other,
wherein the flow rate changing means includes a configuration in which a height of the flow path of the first nozzle, a height of the flow path of the second nozzle, and a height of the flow path of the window portion nozzle are different from each other.

5. The additive manufacturing device according to claim 3, further comprising:
flow rate changing means for causing the flow rates of the inert gases ejected from the first nozzle, the second nozzle, and the window portion nozzle to be different from each other,
wherein the flow rate changing means includes a resistance imparting portion that imparts resistance to the inert gas flowing through at least one flow path among the flow path of the first nozzle, the flow path of the second nozzle, and the flow path of the window portion nozzle.

6. The additive manufacturing device according to claim 3, further comprising:
flow rate changing means for causing the flow rates of the inert gases ejected from the first nozzle, the second nozzle, and the window portion nozzle to be different from each other,
wherein the flow rate changing means includes a configuration in which a height of the flow path of the first nozzle, a height of the flow path of the second nozzle, and a height of the flow path of the window portion nozzle are different from each other, and a resistance imparting portion that imparts resistance to the inert gas flowing through at least one flow path among the flow path of the first nozzle, the flow path of the second nozzle, and the flow path of the window portion nozzle.

7. The additive manufacturing device according to claim 2,
wherein a flow rate of the inert gas ejected from the first nozzle is larger than a flow rate of the inert gas ejected from the window portion nozzle and a flow rate of the inert gas ejected from the second nozzle.

8. The additive manufacturing device according to claim 2,
wherein a flow rate of the inert gas ejected from the second nozzle is larger than a flow rate of the inert gas ejected from the window portion nozzle and a flow rate of the inert gas ejected from the first nozzle.

9. The additive manufacturing device according to claim 1, further comprising:
a guide member which is provided in a corner portion defined by an inner surface of the top plate located on the second side wall side and an upper portion of an inner surface of the second side wall, and is disposed so as not to interfere with an inner surface of the window portion,
wherein the guide member has a guide surface that is exposed to the space defined by the chamber, is curved in a direction toward a corner formed by the inner surface of the top plate and the inner surface of the second side wall, and causes the inert gas ejected from the window portion nozzle to flow along the guide surface.

10. An additive manufacturing device comprising:
a chamber which has a first side wall including an upper opening formed in an upper portion and a lower opening formed in a lower portion located below the upper portion, a second side wall disposed so as to face the first side wall and including a discharge port formed so as to face the lower opening, and a top plate provided from an upper end of the first side wall to an upper end of the second side wall and including a window portion capable of transmitting laser light, and defines a space therein;
a stage which is provided in the chamber and of which an upper surface side is a manufacturing area;
a recoater which is provided in the chamber and supplies a metal powder to an upper surface of the stage;
a laser irradiation unit which irradiates the metal powder deposited on the upper surface of the stage with the laser light through the window portion to manufacture a manufactured product;
a lower nozzle which ejects an inert gas in a horizontal direction into the chamber through the lower opening; and
an upper nozzle which ejects the inert gas into the chamber through the upper opening,
wherein the upper nozzle has
a window portion nozzle that ejects the inert gas along the window portion, and
an oblique nozzle that ejects the inert gas in an obliquely downward direction from the upper portion of the first side wall,
wherein any inert gas ejected from the lower nozzle that is not discharged from the discharge port flows, as residual inert gas, into a space between the second side wall and an optical path of the laser light, and
the window portion nozzle and the oblique nozzle are each configured to eject the inert gas in respective directions so as to confine the flow of residual inert gas within the space between the second side wall and the optical path of the laser light.

11. The additive manufacturing device according to claim 10,
wherein the oblique nozzle has
a first nozzle that has a flow path extending in a first oblique direction from the upper portion of the first side wall toward a lower portion of the second side wall, through which the inert gas flows, and ejects the inert gas in the first oblique direction and
a second nozzle that has a flow path extending in a second oblique direction from the upper portion of the first side wall toward an upper surface of the stage, through which the inert gas flows, and ejects the inert gas in the second oblique direction.

12. The additive manufacturing device according to claim 11,
wherein a flow rate of the inert gas ejected from the window portion nozzle is larger than a flow rate of the inert gas ejected from the first nozzle and a flow rate of the inert gas ejected from the second nozzle.

13. The additive manufacturing device according to claim 12, further comprising:
flow rate changing means for causing the flow rates of the inert gases ejected from the first nozzle, the second nozzle, and the window portion nozzle to be different from each other,
wherein the flow rate changing means includes a configuration in which a height of the flow path of the first nozzle, a height of the flow path of the second nozzle, and a height of the flow path of the window portion nozzle are different from each other.

14. The additive manufacturing device according to claim 12, further comprising:
flow rate changing means for causing the flow rates of the inert gases ejected from the first nozzle, the second nozzle, and the window portion nozzle to be different from each other,
wherein the flow rate changing means includes a resistance imparting portion that imparts resistance to the inert gas flowing through at least one flow path among the flow path of the first nozzle, the flow path of the second nozzle, and the flow path of the window portion nozzle.

15. The additive manufacturing device according to claim 12, further comprising:
flow rate changing means for causing the flow rates of the inert gases ejected from the first nozzle, the second nozzle, and the window portion nozzle to be different from each other,
wherein the flow rate changing means includes a configuration in which a height of the flow path of the first nozzle, a height of the flow path of the second nozzle, and a height of the flow path of the window portion nozzle are different from each other, and a resistance imparting portion that imparts resistance to the inert gas flowing through at least one flow path among the flow path of the first nozzle, the flow path of the second nozzle, and the flow path of the window portion nozzle.

16. The additive manufacturing device according to claim 11,
wherein a flow rate of the inert gas ejected from the first nozzle is larger than a flow rate of the inert gas ejected from the window portion nozzle and a flow rate of the inert gas ejected from the second nozzle.

17. The additive manufacturing device according to claim 11,
wherein a flow rate of the inert gas ejected from the second nozzle is larger than a flow rate of the inert gas ejected from the window portion nozzle and a flow rate of the inert gas ejected from the first nozzle.

18. The additive manufacturing device according to claim 10, further comprising:
a guide member which is provided in a corner portion defined by an inner surface of the top plate located on the second side wall side and an upper portion of an inner surface of the second side wall, and is disposed so as not to interfere with an inner surface of the window portion,
wherein the guide member has a guide surface that is exposed to the space defined by the chamber, is curved in a direction toward a corner formed by the inner surface of the top plate and the inner surface of the second side wall, and causes the inert gas ejected from the window portion nozzle to flow along the guide surface.

* * * * *